(12) United States Patent
Cho et al.

(10) Patent No.: US 9,306,430 B2
(45) Date of Patent: Apr. 5, 2016

(54) IN-WHEEL ACTUATOR AND IN-WHEEL ASSEMBLY COMPRISING THE SAME

(71) Applicant: SAMSUNG ELECTRONICS CO., LTD., Suwon-si (KR)

(72) Inventors: Jin-Woo Cho, Seongnam-si (KR); Seong-Taek Lim, Suwon-si (KR); Sung-Hyuk Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 13/773,938

(22) Filed: Feb. 22, 2013

(65) Prior Publication Data
US 2014/0049094 A1  Feb. 20, 2014

(30) Foreign Application Priority Data
Aug. 17, 2012  (KR) .................. 10-2012-0090268

(51) Int. Cl.
| | |
|---|---|
| *B60K 17/04* | (2006.01) |
| *H02K 7/00* | (2006.01) |
| *B60K 7/00* | (2006.01) |

(Continued)

(52) U.S. Cl.
CPC .............. *H02K 7/006* (2013.01); *B60K 7/0007* (2013.01); *B60K 17/046* (2013.01); *B60L 3/0007* (2013.01); *B60L 11/14* (2013.01); *B60L 11/1803* (2013.01); *B60L 11/1861* (2013.01); *F16H 1/28* (2013.01); *H02K 7/116* (2013.01); *H02K 7/14* (2013.01); *B60K 2007/0038* (2013.01); *B60K 2007/0092* (2013.01); *B60L 2220/14* (2013.01); *B60L 2220/16* (2013.01); *B60L 2220/44* (2013.01); *B60L 2240/26* (2013.01); *B60L 2270/145* (2013.01); *H02K 7/102* (2013.01); *H02K 21/14* (2013.01); *Y02T 10/641* (2013.01); *Y02T 10/70* (2013.01); *Y02T 10/7005* (2013.01); *Y02T10/705* (2013.01); *Y02T 10/7044* (2013.01); *Y02T 10/7077* (2013.01)

(58) Field of Classification Search
CPC ................. B60K 17/046; B60K 7/007; B60K 2007/0038; B60K 2007/0092; H02K 7/006; H02K 21/14; H02K 7/102; F16H 1/28; Y02T 10/641
USPC ......................................................... 180/65.6
See application file for complete search history.

(56) References Cited

U.S. PATENT DOCUMENTS

| | | | | |
|---|---|---|---|---|
| 3,770,074 | A | * | 11/1973 | Sherman ....................... 180/65.6 |
| 5,014,800 | A | * | 5/1991 | Kawamoto et al. ......... 180/65.51 |

(Continued)

FOREIGN PATENT DOCUMENTS

| | | |
|---|---|---|
| KR | 10-2008-0065597 A | 7/2008 |
| KR | 10-2011-0035107 A | 4/2011 |

(Continued)

*Primary Examiner* — Derek D. Knight
*Assistant Examiner* — David Morris
(74) *Attorney, Agent, or Firm* — Sughrue Mion, PLLC

(57) ABSTRACT

An in-wheel assembly includes an in-wheel actuator and a wheel. The in-wheel actuator includes a driving motor; a hollow shaft which is disposed inside of the driving motor and driven by a rotational speed of the driving motor to rotate; a decelerator which is arranged in an inner space of the hollow shaft and configured to reduce a rotational speed of the hollow shaft and output the reduced rotational speed to an output shaft; and a shaft support which is configured to support the hollow shaft to rotate with respect to the driving motor and the decelerator. The wheel accommodates the in-wheel actuator and is driven by a rotational speed decreased by the decelerator to rotate.

7 Claims, 3 Drawing Sheets

(51) Int. Cl.
- *F16H 1/28* (2006.01)
- *H02K 7/116* (2006.01)
- *H02K 7/14* (2006.01)
- *B60L 3/00* (2006.01)
- *B60L 11/14* (2006.01)
- *B60L 11/18* (2006.01)
- *H02K 21/14* (2006.01)
- *H02K 7/102* (2006.01)

(56) References Cited

U.S. PATENT DOCUMENTS

| | | | |
|---|---|---|---|
| 5,163,528 A * | 11/1992 | Kawamoto et al. | 180/65.51 |
| 5,382,854 A * | 1/1995 | Kawamoto et al. | 310/67 R |
| 7,017,694 B2 * | 3/2006 | Shirazawa | 180/65.51 |
| 7,150,340 B2 * | 12/2006 | Beck et al. | 180/242 |
| 7,228,928 B2 * | 6/2007 | Mizutani et al. | 180/65.51 |
| 7,527,113 B2 * | 5/2009 | Jenkins | 180/65.51 |
| 7,717,203 B2 * | 5/2010 | Yoshino et al. | 180/65.51 |
| 2007/0068715 A1 * | 3/2007 | Mizutani et al. | 180/65.5 |
| 2008/0053726 A1 * | 3/2008 | Marsh et al. | 180/65.5 |
| 2008/0265660 A1 | 10/2008 | Hofmann et al. | |
| 2011/0187179 A1 | 8/2011 | Zwarts et al. | |

FOREIGN PATENT DOCUMENTS

| | | |
|---|---|---|
| KR | 10-2011-0048505 A | 5/2011 |
| KR | 10-1127736 B1 | 3/2012 |

\* cited by examiner

IN-WHEEL ACTUATOR AND IN-WHEEL ASSEMBLY COMPRISING THE SAME

CROSS-REFERENCE TO RELATED APPLICATION(S)

This application claims priority from Korean Patent Application No. 10-2012-0090268, filed on Aug. 17, 2012, in the Korean Intellectual Property Office, the entire disclosure of which is incorporated herein by reference for all purposes.

BACKGROUND

1. Field

The following description relates to an in-wheel actuator applicable to a vehicle, such as an electric automobile, which is driven with electrical power, and an in-wheel assembly comprising the same.

2. Description of the Related Art

Hybrid vehicles and electric vehicles have gained more popularity due to harmful environmental effects from air pollution and a shortage of fossil fuels. A hybrid vehicle uses an internal-combustion engine to generate power and uses an electric motor as an auxiliary power source. An electric vehicle uses an electric motor as a main power source.

With the development of technologies for batteries and motors, it is expected that electric vehicles, known as pollution-free cars, replace for "transition" vehicles, such as hybrid cars, since electric vehicles emit no pollutants or carbon dioxide during driving.

An in-wheel system has a driving motor mounted on a wheel, and delivers power from the driving motor directly to the wheel. The application of the in-wheel system allows a vehicle to have a compact and organized driving system, thereby reducing vehicle weight and improving a degree of freedom in vehicle layout or design. In addition, the in-wheel system contributes to optimization of a vehicle frame to increase collision safety. Further, the in-wheel system increases a drive motor performance of the vehicle and facilitates a larger interior space by optimally balancing weight across the vehicle.

In addition, the size of a driving motor is proportional to a level of output torque. Therefore, the bigger the size of the driving motor is, the higher the output torque can be achieved. However, a break and a bearing supporting a hub are installed inside of a wheel of an in-wheel assembly, and a driving motor is installed in the rest of the inside of the wheel. Therefore, the driving motor needs to be thin to prevent interruption from a vehicle body. However, there is a limit to reducing the size of the driving motor, since a high output torque is required to drive a vehicle.

In order to generate high output torque and reduce the size of a driving motor, a decelerator may be installed in an output shaft of a driving motor so as to increase output torque, so that both the decelerator and the driving motor are installed inside of the wheel. In this case, if the driving motor and the decelerator are not arranged compactly or a load is unstably transferred, it may lead to an interruption between the vehicle body and the in-wheel assembly or malfunctions, e.g., vibration or fatigue fracture.

SUMMARY

According to an aspect of an embodiment, there is provided an in-wheel actuator including a driving motor; a hollow shaft which is configured to receive a rotational power of the driving motor to rotate; a decelerator, inserted into a hollow of the hollow shaft and which is configured to decrease a rotational speed of the hollow shaft and output the decreased rotational speed to an output shaft; and a shaft support, which is configured to support the hollow shaft to rotate with respect to the driving motor and the decelerator.

According to an aspect of another embodiment, there is provided an in-wheel assembly including an in-wheel actuator, which comprises a driving motor, a hollow shaft configured to receive a rotational power of the driving motor to rotate, a decelerator inserted into a hollow of the hollow shaft and configured to decrease a rotational speed of the hollow shaft and output the decreased rotational speed to an output shaft, and a shaft support which is configured to support the hollow shaft to rotate with respect to the driving motor and the decelerator; and a wheel which is configured to accommodate the in-wheel actuator and receive a rotational speed decreased by the decelerator to thereby rotate.

According to an aspect of another embodiment, there is provided a decelerator including a decelerator housing which is accommodated by a motor housing and is arranged in a hollow of a hollow shaft; a decelerating part which is disposed between a first support and a second support; and a decelerator fixing portion which is extended from a through-hole of the decelerator housing to embrace a circumference of an output shaft.

Other features and aspects may be apparent from the following detailed description, the drawings, and the claims.

BRIEF DESCRIPTION OF THE DRAWINGS

The above and/or other aspects will become more apparent and readily appreciated from the following description of exemplary embodiments, taken in conjunction with the accompanying drawings, in which.

DETAILED DESCRIPTION

Figure 1:
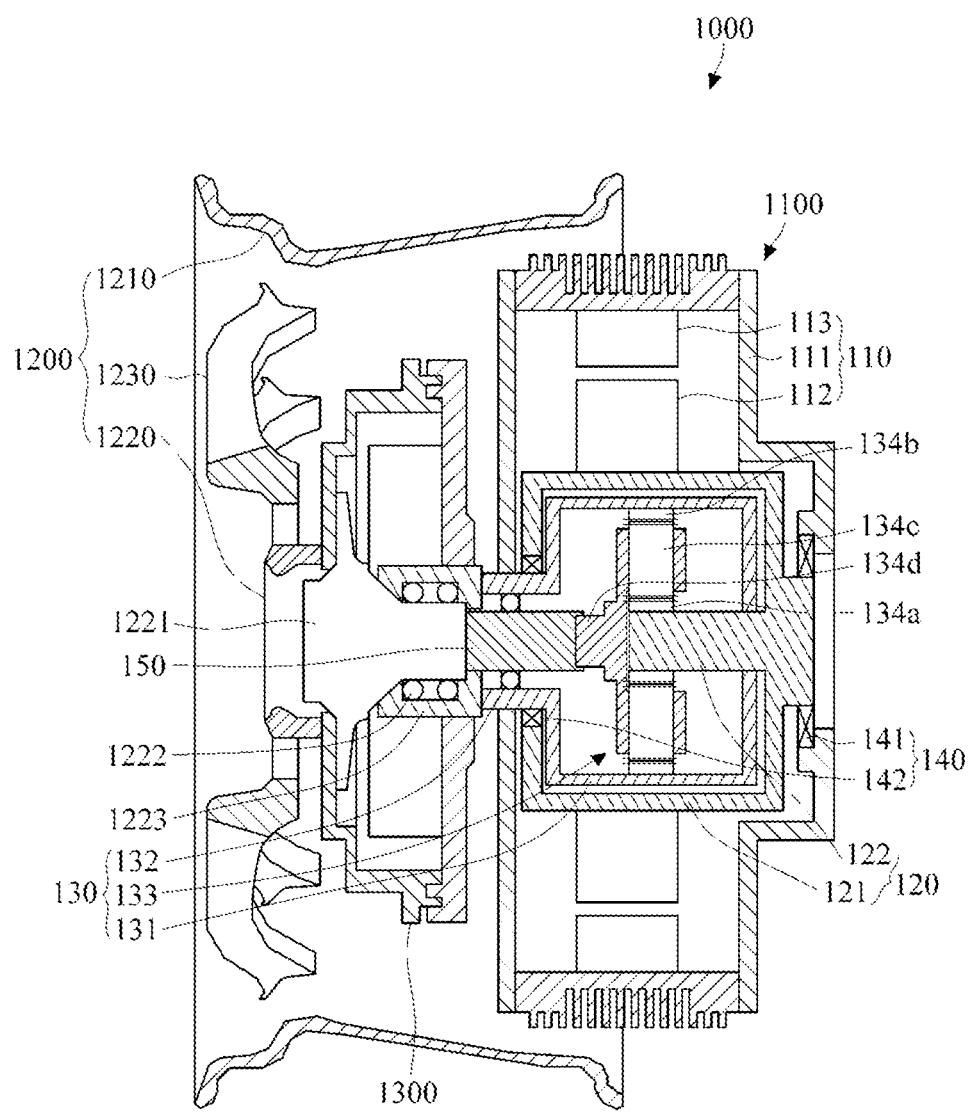
FIG. 1 is a cross sectional view illustrating an in-wheel assembly according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 is a cross sectional view illustrating an in-wheel assembly according to an exemplary embodiment.

Referring to FIG. 1, an in-wheel assembly 1000 includes an in-wheel actuator 1100 and a wheel 1200.

The in-wheel actuator 1100 includes a driving motor 110, a hollow shaft 120, a decelerator 130, and a shaft support 140. The driving motor 110 may generate driving power to rotate the wheel 1200. The hollow shaft 120 is a shaft having a hollow, and is driven by a rotational power of the driving motor 110 to rotate.

The decelerator 130 decreases the rotational speed of the hollow shaft 120 and outputs the decreased rotational speed to an output shaft 150. Accordingly, the decelerator 130 may convert high-speed and low-torque driving of the driving motor 110 to low-speed and high-torque driving of the output shaft 150. The decelerator 130 is inserted into a hollow of the hollow shaft 120. The shaft support 140 supports the hollow shaft 120, to rotate with respect to the driving motor 110 and the decelerator 130.

The wheel 1200 accommodates the in-wheel actuator 1100, and is driven by the rotational power of the output shaft 150 to rotate. The wheel 1200 may be configured such that a tire (not shown) can be mounted on the circumference of the wheel 1200. The tire may rotate with the rotational movement of the wheel 1200.

As discussed above, the decelerator 130 is disposed inside of the driving motor 110 so that the in-wheel actuator 1100 may have a simpler configuration, and become compact, as compared to when the decelerator 130 is arranged on the outside of the driving motor 110 in series. In particular, the in-wheel actuator 1100 is able to generate output torque high enough to drive a vehicle using the decelerator 130, while having a shorter thickness along a rotational axis. Thus, the in-wheel actuator 1100 is mounted on the inside of the wheel 1200 without protruding outward. Therefore, an interruption between the in-wheel actuator 1100 and a vehicle body may be prevented.

In addition, as the hollow shaft 120 is supported by the shaft support 140 to rotate with respect to the driving motor 110 and the decelerator 130, it may help to stabilize a load transfer path from the driving motor 110 through the hollow shaft 120 to the decelerator 130. In this manner, any malfunction, e.g., vibration or fatigue fracture, which is able to occur during execution of the in-wheel actuator 1100 may be prevented.

The wheel 1200 may include a rim 1210, a hub 1220, and a plurality of spokes 1230. The rim 1210 is ring-shaped to enclose the circumference of the in-wheel actuator 1100. In addition, an outer circumference of the rim 1210 is formed in a shape to allow the tire to be mounted thereon. The hub 1220 is placed in the center of the rim 1210. The hub 1220 includes a hub shaft 1221 connected to the output shaft 150.

The hub shaft 1221 may rotate, supported by a hub bearing 1222. For example, a hub shaft inserter 1223 into which the hub shaft 1221 is inserted, is fixed onto the outside of the motor housing 111 of the driving motor 110. In addition, the hub bearing 1222 may be installed inside of the hub inserter 1223, to support rotation of the hub shaft 1221. Between the rim 1210 and the hub 1220, a plurality of spokes 1230 are arranged on the circumference of the hub 1220. The spokes 1230 have one end connected to the rim 1210 and the other end connected to the hub 1220.

A drum break 1300 may be accommodated inside of the wheel 1200. Inside of the wheel 1200, the drum break 1300 rather than a motor housing 111 may be arranged closer to the wheel 1200 and fixed to the wheel 1200. The drum break 1300 may be fixed to the hub 1220 of the wheel 1200 to thereby be rotated with the wheel 1200. Various breaking devices, besides the drum break 1300, e.g., a disk break, may be provided inside the wheel 1200.

The driving motor 110 may include the motor housing 111, a rotor 112 and a stator 113. The motor housing 111 may be in a cylindrical shape having an inner space, and the rotor 112 and the stator 113 may be accommodated in the inner space of the motor housing 111. The output shaft 150 may be drawn out from a through-hole formed on a surface of the motor housing 111 forward of the wheel 1200. In addition, although not illustrated in the drawings, a plurality of radiation fins may be arranged on the outer surface of the motor housing 111. A plurality of radiation fins helps to improve radiant heat performance of the motor housing 111 using air-cooling effects.

The rotor 112 is rotatably disposed in the middle of the motor housing 111. The hollow shaft 120 is inserted into the center of the rotor 112 in a direction of a rotational axis, and then fixed to the rotor 112. For example, the rotor 112 may have a cylindrical shape having a through-hole in the middle of the rotor 112. The hollow shaft 120 may be fixed onto the inner wall of the rotor 112. Accordingly, a rotational power of the rotor 112 may be transferred through the hollow shaft to the decelerator 130.

The stator 113 is spaced apart from the circumference of the rotor 112. The stator 113 is fixed onto the inner wall of the motor housing 111. For example, the stator 113 may have a cylinder shape, having a hollow into which the rotor 112 is inserted, and fixed onto the inner circumference of the motor housing 111.

The rotor 112 may have a permanent magnet, and the stator 113 may have a stator coil. In response to current being provided to the stator coil while a magnetic field is generated by the permanent magnet, the rotor 112 rotates by electromagnetic power to thereby generate driving force. In addition, the driving motor 110 may be an outer driving motor that has a rotor rotatably coupled around the circumference of a stator to thereby be provided with power.

The decelerator 130 may include a decelerator housing 131 and a decelerating part 133. The decelerator housing 131 is accommodated by the motor housing 111. For example, the decelerator housing 131 is placed in a hollow of the hollow shaft 120. In addition, the decelerator housing 131 is fixed to the decelerator housing 131. The output shaft 150 may be drawn out from a through-hole formed in a portion of the motor housing 111 toward the wheel 1200. The decelerating part 131 decreases a rotational speed transferred from the hollow shaft 120 within the decelerator housing 131.

The shaft support 140 may include a first support 141 and a second support 142. For simplicity, among both ends of the hollow shaft 120, one end extending toward the wheel 1200 is referred to as a front end and the other end is referred to as a rear end. The first support 141 is able to support the rear end of the hollow shaft 120 to rotate with respect to the motor housing 111. The second support 142 is able to support the front end of the hollow shaft 120 to rotate with respect to the decelerator housing 131.

For example, the hollow shaft 120 may include a shaft body 121 and a shaft protrusion 122. The shaft body 121 has a hollow and is fixed onto the inner wall of the rotor 112. The shaft protrusion 122 is connected to the rotation center of the rear side of the shaft body 121. Specifically, the front end of the shaft protrusion 122 may protrude from the rear side of the shaft body 121 toward the inside of the decelerator housing 131, and the rear end of the shaft protrusion 122 may protrude from the rear end of the shaft body 121 toward the outside of the decelerator housing 131. Between the rear end of the shaft protrusion 122 and the motor housing 111, the first support 141 may support the rear end of the shaft protrusion 122. The first support 141 may include a bearing, which is installed between the rear end of the shaft protrusion 122 and the motor housing 111.

The decelerator housing 131 includes the decelerating fixing portion 132, which is extended from the through-hole of the decelerator housing 131 to embrace the circumference of the output shaft 150 and is fixed to the motor housing 111. The front end of the shaft body 121 is extended to face the circumferential surface of the decelerator fixing portion 132. Between the decelerator fixing portion 132 and the front end of the shaft body 121, the second support 142 may support the front end of the shaft body 121 to rotate. The second support 142 may include a bearing, which is installed between the decelerator fixing portion 132 and the front end of the shaft body 121.

The decelerating part 133 is disposed between the first and second supports 141 and 142, being spaced apart from each other. Thus, the hollow shaft 120 may be stably supported by the first and second supports 141 and 142 to rotate.

The decelerator 133 may reduce a rotational speed received from the rotor 112 by one step, and transfer to the output shaft 150 the rotational speed reduced by one step.

Figure 2:
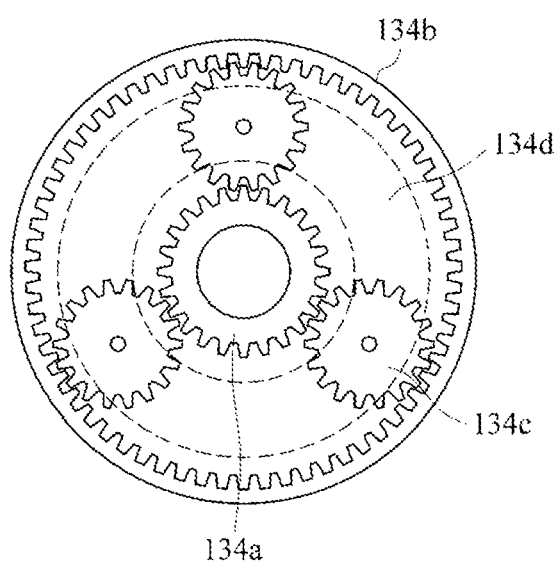
FIG. 2 is a diagram illustrating a decelerating part of FIG. 1 according to an exemplary embodiment.

Referring to FIGS. 1 to 2, the decelerating part 133 may include a sun gear 134a, a ring gear 134b, a plurality of planet gears 134c, and a carrier 134d.

The sun gear 134a is connected to the hollow shaft 120 and receives a rotational speed of the rotor 112 to rotate. The sun gear 134a may be arranged on the circumferential surface of the front end of the shaft protrusion 122. The ring gear 134b is connected to the inner wall of the decelerator housing 131 to face the sun gear 134a. The ring gear 134b is fixed, and does not rotate with the sun gear 134a.

Between the sun gear 134a and the ring gear 134b, the planet gears 134c are arranged on the circumference of the sun gear 134a. Each of the planet gears 134c is engaged to the sun gear 134a, and the other end is engaged to the ring gear 134b. The planet gears 134c orbit and revolve between the sun gear 134a and the ring gear 134b.

The carrier 134d is coupled to the output shaft 150. In addition, the carrier 134d is coupled to the planet gears 134c, to thereby rotate along a rotational axis of the output shaft 150, in response to revolution of the planet gears 134c. At this time, each of the planet gears 134c is orbitably coupled to the carrier 134d. The carrier 134d transfers to the output shaft 150 a rotational power generated from the revolution of the planet gears 134d.

An operation of the decelerating part 133 will now be described. If the sun gear 134a is driven by the rotor 112 to rotate, a rotational speed of the carrier 134d is slower than a rotational speed of the rotor 112. Accordingly, the rotational speed of the rotor 112 is decreased by the decelerating part 133, and the decreased rotational speed is transferred to the output shaft 150.

As another example, a decelerating part 233 may decrease the rotational speed received from the rotor 112 by two steps, and transfer to the output shaft 150 the rotational speed reduced by two steps. In this case, a high reduction ratio may be achieved. Thus, the output shaft 150 may output a higher torque.

Figure 3:
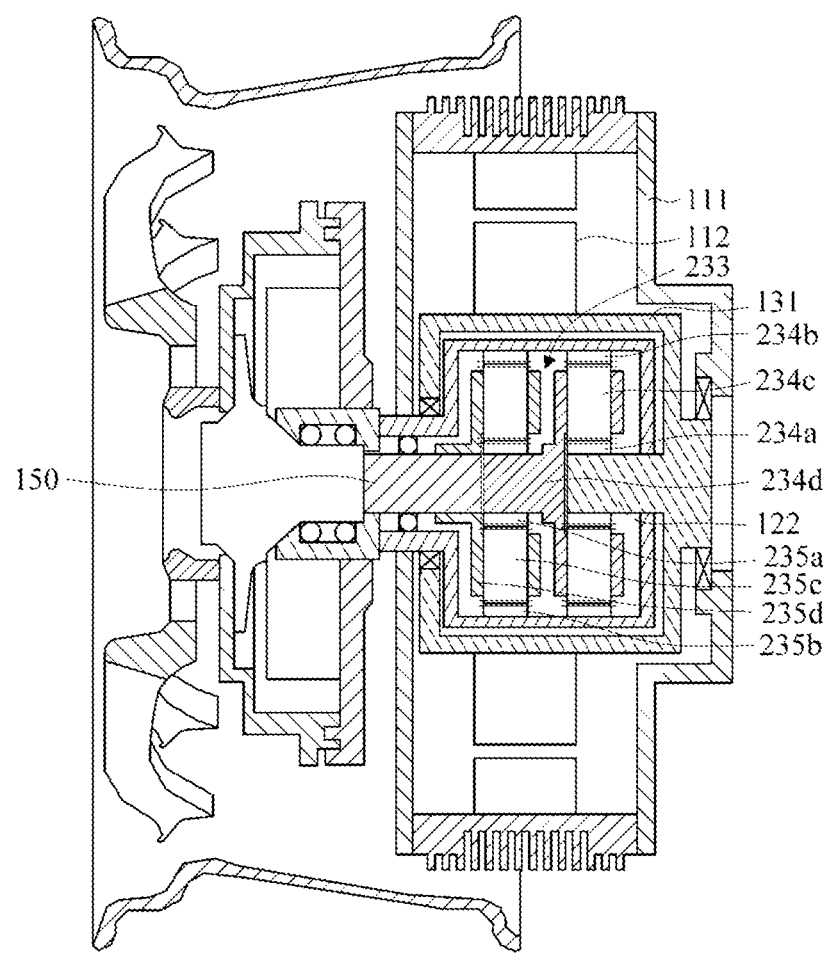
FIG. 3 is a cross sectional view illustrating an in-wheel assembly including a decelerating part with respect to FIG. 1 according to another exemplary embodiment.

Referring to FIG. 3, the decelerating part 233 includes a first sun gear 234a, a second sun gear 235a, a first ring gear 234b, a second ring 235b, a plurality of first planet gears 234c, a plurality of second planet gears 235c, a first carrier 234d, and a second carrier 235d.

The first sun gear 234a is arranged on the circumferential surface at the front end of the shaft protrusion 122, and receives a rotational speed of the rotor 112 to thereby rotate. The first ring gear 234b is arranged on the inner wall of the decelerator housing 131 to face the first sun gear 234a. The first ring gear 234b is fixed, and does not rotate in response to rotation of the first sun gear 234a.

Between the first sun gear 234a and the ring gear 234b, the first planet gears 234c are arranged on the circumference of the first sun gear 234a. Each of the first planet gears 234c has one end engaged to the first sun gear 234a, and the other end engaged to the first ring gear 234b. The first planet gears 234c orbit and revolve between the first sun gear 234a and the first ring gear 234b in response to rotation of the first sun gear 234a. The first carrier 234d is coupled to the first planet gears 234c, so that the first carrier 234d may be driven by revolution of the first planet gears 234c to rotate. The first carrier 234d transfers rotation power generated by the revolution of the first planet gears 234c into the second sun gear 235a.

The second sun gear 235a is arranged on the circumference of the first carrier 234d. The second ring gear 235b is arranged on the inner wall of the decelerator housing 131 to face the second sun gear 235a. Between the second sun gear 235a and the second ring gear 235b, the second planet gears 235c are arranged on the circumference of the second sun gear 235a. Each of the second planet gears 235c has one end engaged to the second sun gear 235a, and the other end engaged to the second ring gear 235b.

The second carrier 235d is coupled to the output shaft 150. In addition, the second carrier 235d is coupled to the second planet gears 235c to thereby rotate along a rotational axis of the output shaft 150 in response to rotation of the second planet gears 235c. The second carrier 235d transfers to the output shaft 150 a rotational speed generated by revolution of the second planet gears 235c.

An operation of the decelerating part 233 will now be described. A rotational speed of the rotor 112 is transferred to the first sun gear 234a, and first reduced in the first planet gears 234c and the first carrier 234d. The first-reduced rotational speed is transferred to the second sun gear 235a, and second reduced in the second planet gears 235c and the second carrier 235d. As the second-reduced rotational speed is transferred to the output shaft 150, the output shaft 150 may output a higher torque.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An in-wheel actuator comprising a driving motor, a hollow shaft, a decelerator, an output shaft, and a shaft support, wherein the driving motor comprises a motor housing, a rotor which is rotatably arranged in the motor housing, and a stator which is spaced apart from a circumference of the rotor and fixed to an inner wall of the motor housing, wherein the hollow shaft is inserted into and fixed in a center of the rotor and is configured to receive a rotational power of the rotor to rotate, wherein the hollow shaft comprises a shaft body which has a hollow and is fixed onto an inner wall of the rotor, and a shaft protrusion which is connected to a rotation center of a first end of the shaft body, wherein the decelerator comprises a decelerator housing which is inserted into the hollow of the shaft body and fixed to the motor housing, and a decelerating part configured to decrease a rotational speed of the hollow shaft within the decelerator housing and output the decreased rotational speed, wherein the output shaft is configured to receive the decreased rotational speed output by the decelerator part, wherein the shaft support comprises a first supporter configured to support the first end of the shaft body to rotate with respect to the motor housing, and a second supporter configured to support a second end of the shaft body to rotate with respect to the decelerator housing, wherein the decelerator housing comprises a decelerator fixing portion which is extended from a through-hole of the decelerator housing to support a circumference of the output shaft which extends from the through-hole, wherein the second end of the shaft body is extended to face an outer circumferential surface of the decelerator fixing portion, wherein a first end of the shaft protrusion protrudes from the first end of the shaft body toward the outside of the decelerator housing, wherein the first supporter is configured to support the shaft protrusion between the motor housing and the protruded first end of the shaft protrusion, and wherein the second supporter is configured to support the shaft body between the decelerator fixing portion and the extended second end of the shaft body.

2. The in-wheel actuator of claim 1, wherein each of the first support and the second support comprises a bearing.

3. The in-wheel actuator of claim 1, wherein the decelerating part comprises:
a sun gear which is connected to the hollow shaft;
a ring gear which is arranged on an inner wall of the decelerator to face the sun gear;
a plurality of planet gears which are disposed between the sun gear and the ring gear and arranged on a circumference of the sun gear, each of the plurality of planet gears having one end engaged to the sun gear and another end engaged to the ring gear; and
a carrier which is configured to transfer a rotational speed generated by a rotation of the plurality of planet gears to the output shaft.

4. The in-wheel actuator of claim 1, wherein the decelerating part comprises:
a first sun gear which is connected to the hollow shaft;
a first ring gear which is arranged on an inner wall of the decelerator housing to face the first sun gear;
a plurality of first planet gears which are disposed between the first ring gear and the first sun gear, arranged on a circumference of the first sun gear, and have one end engaged to the first sun gear and the other end engaged to the first ring gear;
a first carrier which is configured to be driven by revolution of the plurality of first planet gears to rotate;
a second sun gear which is arranged on a circumference of the first carrier;
a second ring gear which is arranged on the inner wall of the decelerator housing to face the second sun gear;
a plurality of second planet gears which are disposed between the second sun gear and the second ring gear, arranged on a circumference of the second sun gear, and have one end engaged to the second sun gear and another end engaged to the second ring gear; and
a second carrier which is configured to transfer a rotational speed generated by revolution of the plurality of second planet gears to the output shaft.

5. An in-wheel assembly comprising:
an in-wheel actuator which comprises a driving motor, a hollow shaft, a decelerator, an output shaft, and a shaft support; and
a wheel which accommodates the in-wheel actuator and is configured to receive rotational power output from the in-wheel actuator,
wherein the driving motor comprises a motor housing, a rotor which is rotatably arranged in the motor housing, and a stator which is spaced apart from a circumference of the rotor and fixed onto an inner wall of the motor housing,
wherein the hollow shaft is inserted into and fixed in a center of the rotor, and is configured to receive a rotational power of the rotor to rotate,
wherein the hollow shaft comprises a shaft body which has a hollow and is fixed onto an inner wall of the rotor, and a shaft protrusion which is connected to a rotation center of a first end of the shaft body,
wherein the decelerator comprises a decelerator housing which is inserted into the hollow of the shaft body and fixed to the motor housing, and a decelerating part configured to decrease a rotational speed of the hollow shaft within the decelerator housing and output the decreased rotational speed,
wherein the output shaft is configured to receive the decreased rotational speed output by the decelerator part,
wherein the shaft support comprises a first supporter configured to support the first end of the shaft body to rotate with respect to the motor housing, and a second supporter configured to support a second end of the shaft body to rotate with respect to the decelerator housing,
wherein the decelerator housing comprises a decelerator fixing portion which is extended from a through-hole of the decelerator housing to support a circumference of the output shaft which extends from the through-hole,
wherein the second end of the hollow-shaft body is extended to face an outer circumferential surface of the decelerator fixing portion, and
wherein a first end of the shaft protrusion protrudes from the first end of the shaft body toward the outside of the decelerator housing, wherein the first supporter is configured to support he shaft protrusion between the motor housing and the protruded first end of the shaft protrusion, and
wherein the second supporter is configured to support the shaft body between the decelerator fixing portion and the extended second end of the shaft body.

6. The in-wheel assembly of claim 5, wherein the wheel comprises
a hub shaft which is coupled to the output shaft;
a hub shaft inserter which is fixed to the motor housing and having the hub shaft inserted in the hub shaft inserter; and
a hub bearing which is configured to support the hub shaft to rotate within the hub shaft inserter.

7. The in-wheel assembly of claim 5, further comprising:
a drum brake which is arranged closer to the wheel than the motor housing and fixed to the wheel.

* * * * *